United States Patent [19]
Rosta

[11] 3,752,418
[45] Aug. 14, 1973

[54] ANTI-TORQUE SYSTEM FOR TIP DRIVEN ROTOR BLADES

[75] Inventor: William N. Rosta, Fort Worth, Tex.

[73] Assignee: The VLM Corporation, Fort Worth, Tex.

[22] Filed: May 12, 1972

[21] Appl. No.: 252,623

[52] U.S. Cl. ............................ 244/23 C, 244/17.19
[51] Int. Cl. ............................................... B64c 29/00
[58] Field of Search ...................... 244/17.19, 23 C, 244/23 R, 12 C, 12 R, 17.11, 17.23

[56] References Cited
UNITED STATES PATENTS
3,507,461  4/1970  Rosta ............................ 244/23 C X
3,677,503  7/1972  Freeman, Jr. ..................... 244/23 C

*Primary Examiner*—Milton Buchler
*Assistant Examiner*—Paul E. Sauberer
*Attorney*—Giles C. Clegg, Jr. et al.

[57] ABSTRACT

Disclosed ia an anti-torque and yaw control system for rotary wing aircraft employing tip driven rotor blades. The rotor blades are driven by a turbine drive ring powered by high velocity fluid. The drive ring is enclosed in a shroud and fluid passing through the turbine ring is collected in a ducted fan axially alligned tangentially with the dirve ring. The ducted fan is also tip driven by fluid from the main drive fluid supply. Alternative arrangements for varying the thrust of the ducted fan are shown. A jet thruster cooperating with the drive system is used for yaw control.

8 Claims, 8 Drawing Figures

ANTI-TORQUE SYSTEM FOR TIP DRIVEN ROTOR BLADES

This invention relates to an anti-torque system for rotary wing aircraft. More particularly it relates to an improved feed station for rotary wing aircraft wherein the rotor is driven by fluid conducted through a turbine ring attached to the outer tips of the rotor blades, the improved feed station including an anti-torque fan and a maneuvering thruster.

Rotary wing aircraft employing a plurality of rotors suspended between concentric inner and outer rings are described in U.S. Pat. No. 3,507,461. In such aircraft the rotor assembly is driven by pressurized fluid conducted through a turbine ring attached to the outer tips of the rotor blades, thereby providing a tip driven rotor assembly which eliminates mechanical power transmission apparatus. Fluid, such as air, is conducted to the outer ring assembly and forced through an endless turbine ring to drive the rotor assembly.

In accordance with the present invention a modified feed station is provided for controlling the distribution of the drive fluid at the turbine drive ring. Since energy is transferred from the high velocity drive fluid to the rotor drive ring at the feed station, counteracting forces resulting from the contact of the drive fluid with the turbine blade generate torque causing counter rotation of the aircraft. An anti-torque system utilizing drive fluid from the drive supply stream is provided which counteracts the torque generated at the turbine drive ring. The anti-torque system comprises a ducted fan mounted axially with the plane of rotation of the rotor driven by drive fluid from the main drive fluid line. Exhaust fluid from the turbine ring is conducted into the duct surrounding the ducted fan and forced out of the duct by the fan to generate an impulse sufficient to counteract the counter rotational forces generated at the turbine drive ring. The ducted fan also includes a variable aperture which controllably admits ambient air into the fan duct to vary the thrust of the ducted fan.

The ducted fan anti-torque system provides an essentially fixed relation between anti-torque and torque since the thrust of the anti-torque device is partially controlled by the pressure of the main supply fluid stream. Accordingly, the counter-rotational forces generated by the anti-torque system will substantially counteract the torque generated by the drive system regardless of operational pressure in the main fluid supply and the angular velocity of the rotor. Furthermore, since the anti-torque device is itself a tip driven fan, only one moving part is added to the entire assembly, thus providing an extremely simple and effective anti-torque system. Furthermore, a ducted fan provides a higher efficiency than an unducted fan, and the fan duct itself acts as a noise suppressor on noise generated by the turbine drive and nozzle. An auxiliary thruster is provided at the feed station to allow unbalanced torque conditions or yaw control.

These and other advantages of the invention will become more readily understood from the following detailed description taken in connection with the appended claims and attached drawings in which:

Figure 1:
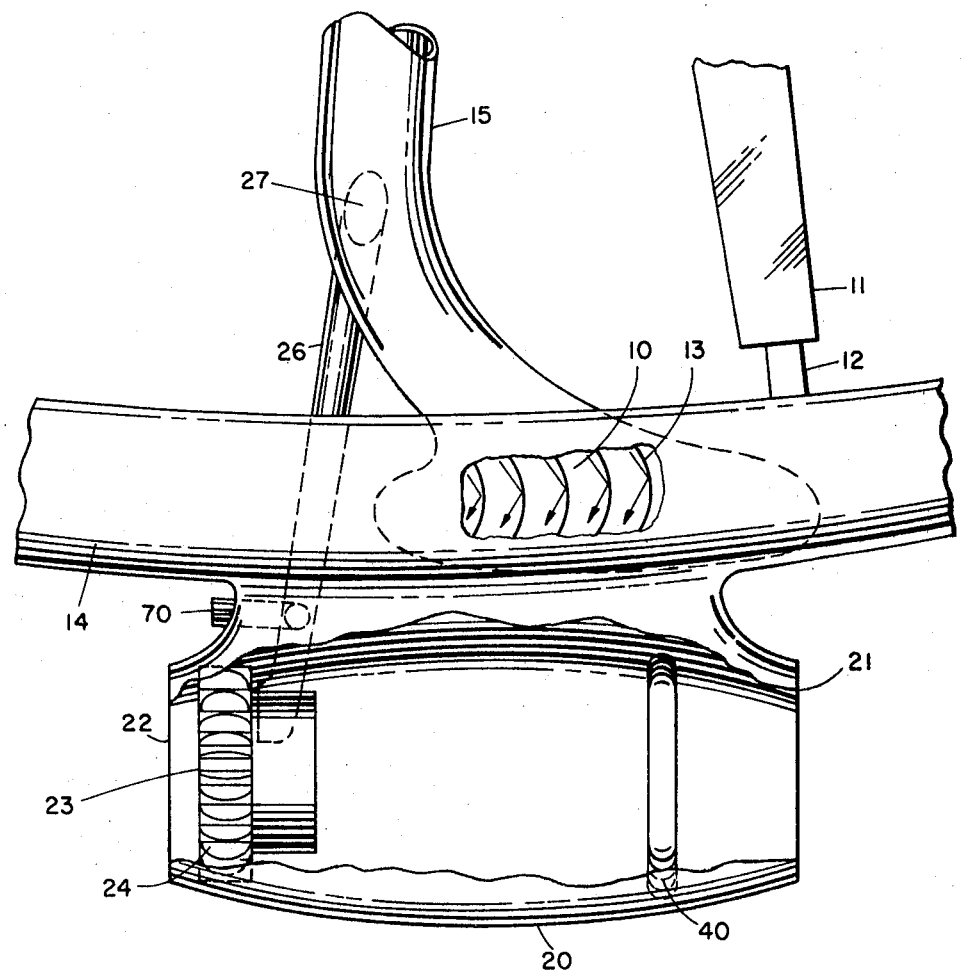
FIG. 1 is a top plan view partially in section of the feed station assembly of the invention.
Figure 8:
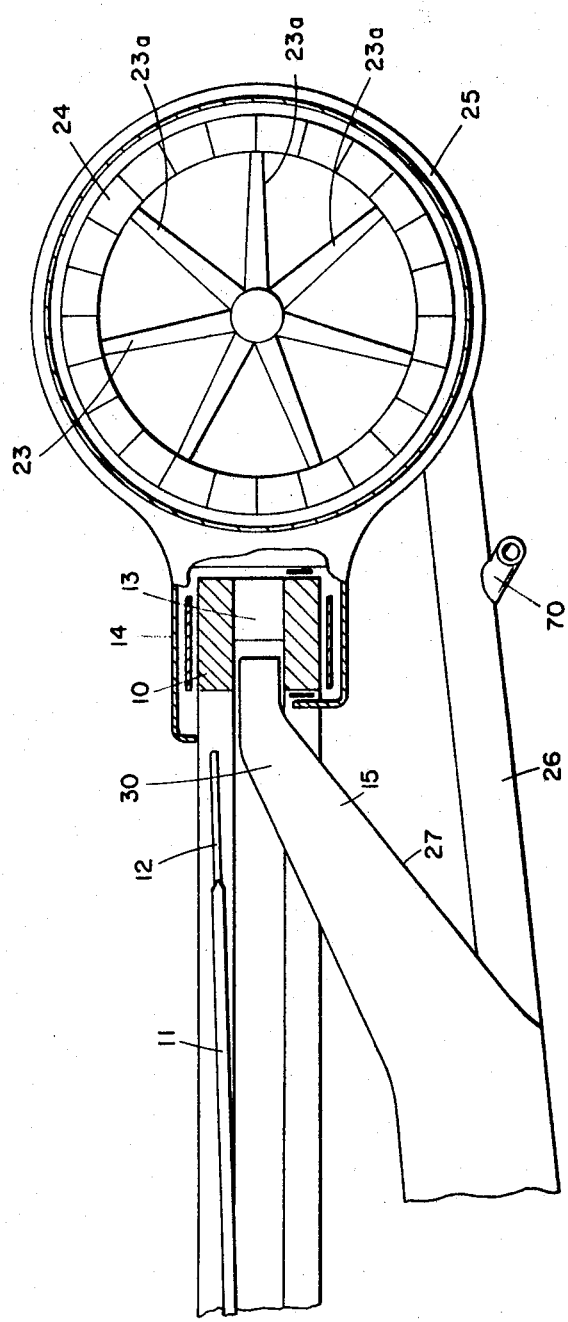
FIG. 8 is a sectional view of the apparatus illustrated in FIG. 1 taken through the line 8—8.

Referring now to FIGS. 1 and 8, in which like numerals indicate like parts, there is illustrated a portion of the outer ring structure and the feed station of the invention. The outer ring structure comprises a drive ring 10 to which a plurality of rotor blades 11 are attached at spaced intervals by means of pivot pin 12. Drive ring 10 is mounted for rotation on suitable bearings (not illustrated). A series of turbine blades 13 are secured within the drive ring 10 and the drive ring and associated bearings enclosed within a suitable housing 14. The housing, of course, has a continuous slot along its inner circumference through which pivot pin 12 travels as the drive ring and rotors rotate. Drive fluid, such as air, is forced through a main drive supply line 15 which is in fluid communication with the housing 14 having a nozzle 30. The drive fluid is directed by the nozzle 30 to impinge on turbine blades 13 causing the drive ring and attached rotors to rotate.

As illustrated in FIG. 1, drive fluid passing through the supply line 15 impinges on the turbine blades 13 to transfer energy to the drive ring. The drive fluid is deflected outwardly by the turbine blades. The deflected drive fluid is directed into a ducted fan housing 20 opposite the inlet nozzle.

Fan housing 20 is substantially cylindrical and has an inlet 1 and outlet 2. The housing 20 is axially aligned with the plane of rotation of the drive ring 10 and carries a fan 23 mounted coaxially therein near the outlet 2. It will thus be observed that drive fluid deflected from turbine blades 13 is collected in the fan housing 20 and forced out the outlet 2 by fan 23.

Fan 23 is preferably a free-rotating fixed pitch fan centrally mounted near the outlet 2 of housing 20. The outer ends of fan blades 23a are joined by a ring which supports laterally extending turbine blades 24. Turbine blades 24 extend into a plenum chamber 25 surrounding or contained within housing 20 and in fluid communication with a bypass line 26. Bypass line 26 is connected to main supply line 15 between the fluid source (not shown) and nozzle 30. By pass line 26 is connected to the supply line 15 through an orifice 27 which is adapted to divert approximately 10 percent to 20 percent of the fluid passing through line 15 into the bypass line. The diverted drive fluid is directed over the turbine blades of fan 23 to drive the fan which in turn draws the fluid diverted from turbine blades 13 through the housing 20. It will thus be observed that fan 23 provides torque in direct opposition of the counter-rotational torque caused by drive fluid impinging on the turbine blades 13.

By maintaining orifice 27 fixed, a relatively constant ratio of bypass to drive fluid may be maintained. Therefore, the counter-rotational force generated by fan 23 will at all times be substantially proportional to the rotational force generated by the drive fluid impinging on the turbine blades 13.

As shown in FIG. 1, fan housing 20 has an inlet 1 for admitting ambient air into the fan housing. The flow of additional air through inlet 1 will vary the thrust generated by fan 23. Since fan 23 preferably has fixed pitch blades and the rotational speed thereof is determined by the pressure in the drive fluid line 15, the thrust of fan 23 may be varied as desired within limits by controlling the size of the aperture admitting ambient air into housing 20.

FIGS. 2, 3, 4, 5 and 6 illustrate several alternative means for controllably regulating the flow of air through inlet 1.

Figure 2:
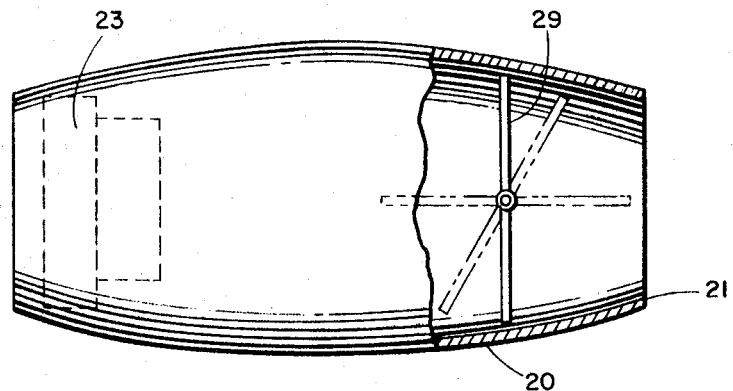
FIG. 2 is a side view partially in section of the ducted fan shroud of one embodiment of the invention.

As illustrated in FIG. 2, a simple vane or damper 29 may be rotatably fixed within the housing 20 to act as a butterfly valve regulating the flow of air through the inlet 1. As illustrated in FIG. 2, damper 29 may be rotated about an axis perpendicular to the axis of the housing 20. Accordingly, the flow of ambient air through inlet 1 may be varied as desired by adjustably positioning damper 29 to partially obstruct the inlet 1. Damper 29, of course, may be moved mechanically, hydraulically or electrically by conventional control means (not shown).

Figure 3:
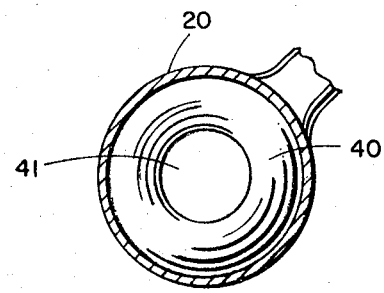
FIG. 3 is a front view of one embodiment of a variable aperture for the ducted fan of FIG. 1.
Figure 4:
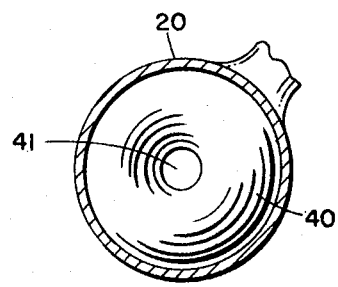
FIG. 4 is a front view of the embodiment of FIG. 3 showing a variable aperture partially closed.

In the alternative embodiment illustrated in FIGS. 3 and 4, an elastic constrictor 40, preferably in the general shape of a doughnut, is secured within the inlet 1. In its relaxed form, as shown in FIG. 3, the constrictor 40 has a relatively large central opening 41. As the constrictor 40 is inflated, as with air or other fluid, the opening 41 is generally reduced as illustrated in FIG. 4. It will thus be observed that the flow of ambient air into inlet 1 may be variably controlled as desired by controlling fluid pressure in constrictor 40.

Figure 5:
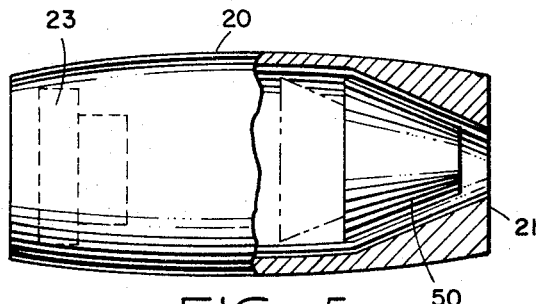
FIG. 5 is a side view partially in section of an alternative embodiment of the ducted fan arrangement of FIG. 1.

In the embodiment illustrated in FIG. 5, a horizontally moveable cone 50 is mounted within housing 20. Inlet 1 is cone shaped and the cone 50 is adapted to substantially conform to the inner surface of inlet 1 in housing 20.

It will thus be observed that by moving the cone 50 longitudinally with respect to the housing 20, the diameter of the annular orifice formed by inlet 1 and cone 50 may be varied as desired to control the flow of air through the inlet.

Figure 6:
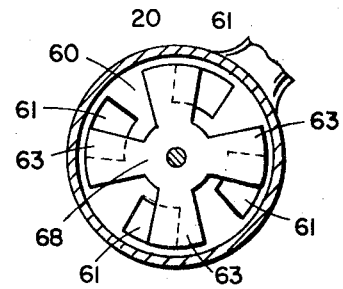
FIG. 6 is a front view of the ducted fan of FIG. 1 showing alternative means for varying the aperture.
Figure 7:
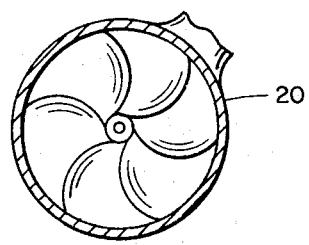
FIG. 7 is a front view of the ducted fan of FIG. 1 showing alternative means for varying the aperture.

Alternative shutter arrangements are illustrated in FIGS. 6 and 7 for varying the flow of air through inlet 1. As shown in FIG. 6, inlet 1 may be covered with a plate 60 having apertures 61 therein. A shutter plate 62 is secured thereover for rotation about the axis of the housing 20. Shutter plate 62 has vanes 63 approximately corresponding to the apertures 61 so that upon rotation of the shutter plate 62 apertures 61 may be gradually closed to vary the flow of air into the inlet 1. Likewise, as shown in FIG. 7, a series of shutter vanes 67 positioned within inlet 1 of housing 20 may be individually or collectively positioned as desired to control air flow into the ducted fan.

As described in U.S. Pat. No. 3,507,461, rotary wing aircraft utilizing a tip driven rotor system may employ a plurality of feed stations to drive a single turbine drive ring. Likewise, a plurality of feed station systems as described herein may be used in a single aircraft. Such stations are generally employed in pairs, each station of the pair positioned diametrically opposed from the other feed station on the turbine drive ring. Where the feed stations are positioned on opposite sides of the aircraft, one ducted fan may be providing thrust in the direction of travel of the aircraft while the other ducted fan is providing thrust in the opposite direction. Accordingly, individual control of the anti-torque thrust generated at each feed station may be provided.

It will also be observed that the ducted fan may be used to provide yaw control for the aircraft. Varying the thrust generated by opposed pairs of anti-torque systems will produce an unbalanced anti-torque condition allowing the aircraft to rotate as desired.

Alternatively, jet thrusters 70 as illustrated in FIGS. 1 and 8 may be provided for yaw control. Thrusters 70 may be a simple nozzle aligned in the direction opposite the desired maneuvering thrust and in fluid communication with the drive fluid supply.

The thrusters 70 may be stationary with respect to the airframe or reversible to provide thrust in either direction. The flow of high velocity fluid through the jet thruster may be variably controlled by suitable valves.

From the foregoing it will be observed that the system described may be used in connection with a tip driven rotor system to counteract the counter-rotational torque generated by high velocity drive fluid impinging on the drive turbine. Furthermore, since the deflected drive fluid is collected in a ducted fan shroud, some of the noise generated by the turbine drive is suppressed. Yaw control may also be provided by the anti-torque fans or the jet thrusters individually or collectively.

It is to be understood that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

What is claimed is

1. Apparatus for controlling fluid in a turbine drive attached to the outer tips of a plurality of rotors in a rotary wing aircraft comprising:
   a. means for dividing fluid conducted under pressure into a drive stream and a bypass stream;
   b. means for directing said drive stream over a turbine drive ring attached to the outer tips of a plurality of rotors;
   c. fan means axially aligned with the plane of rotation of said turbine drive ring;
   d. turbine means for driving said fan means; and
   e. means for directing said bypass stream over said turbine means for driving said fan.

2. Apparatus as defined in claim 1 including means for directing a jet of drive fluid along a line tangential to the plane of rotation of said drive ring, thereby to produce unbalanced torque on said rotary wing aircraft.

3. Apparatus as defined in claim 1 including shroud means substantially enclosing said turbine drive ring.

4. Apparatus as defined in claim 3 including:
   a. substantially cylindrical shroud means having an inlet and an outlet at opposite ends thereof mounted with the axis thereof substantially tangential to the plane of rotation of said turbine drive means and enclosing said fan means near said outlet; and b. means for conducting fluid passing through said turbine drive ring into said cylindrical shroud means.

5. Apparatus as defined in claim 4 including means for varying the rate of flow of air through said inlet.

6. Apparatus as defined in claim 5 wherein said means for varying the rate of flow of air through said inlet comprises elastic inflatable means positioned within said inlet to at least partially obstruct said inlet when inflated.

7. Apparatus as defined in claim 1 wherein said means for dividing fluid conducted under pressure comprises a main conduit having an inlet and first and second outlets, each outlet terminating in a nozzle, said first outlet communicating with said main conduit through an orifice of fixed dimensions adapted to divert approximately 10 percent to 20 percent of the fluid passing through said main conduit into said first outlet.

8. In a rotary wing aircraft having a plurality of rotor blades attached at their outer tips to a drive ring including turbine blade means and a source of fluid for driving said turbine blade means, a fluid feed system comprising:
   a. a shroud substantially enclosing said drive ring;
   b. means for dividing fluid into first and second streams;
   c. means for directing said first fluid stream into said turbine blade means;
   d. a ducted fan disposed adjacent said shroud, the axis of said fan being substantially tangential to the plane of rotation of said rotor blades;
   e. fluid driven means for driving said ducted fan;
   f. means for directing said second fluid stream to said fluid driven means; and
   g. means for conducting fluid passing through said turbine blade means into said ducted fan.

* * * * *

UNITED STATES PATENT OFFICE
CERTIFICATE OF CORRECTION

Patent No. 3,752,418    Dated AUGUST 14, 1973

Inventor(s) WILLIAM N. ROSTA

It is certified that error appears in the above-identified patent and that said Letters Patent are hereby corrected as shown below:

Column 2, line 39, change "inlet 1 and outlet 2" to --inlet 21 and outlet 22--;

Column 2, line 42, change "outlet 2" to --outlet 22--;

Column 2, line 44, change "outlet 2" to --outlet 22--;

Column 2, line 46, change "outlet 2" to --outlet 22--;

Column 3, line 3, change "inlet 1" to --inlet 21--;

Column 3, line 5, change "inlet 1" to --inlet 21--;

Column 3, line 14, change "inlet 1" to --inlet 21--;

Column 3, line 18, change "inlet 1" to --inlet 21--;

Column 3, line 21, change "inlet 1" to --inlet 21--;

Column 3, line 22, change "inlet 1" to --inlet 21--;

Column 3, line 28, change "inlet 1" to --inlet 21--;

Column 3, line 34, change "inlet 1" to --inlet 21--;

Column 3, line 38, change "inlet 1" to --inlet 21--;

Column 3, line 39, change "inlet 1" to --inlet 21--;

Column 3, line 43, change "inlet 1" to --inlet 21--;

Continued on page 2

Page 2, Patent No. 3,752,418

Column 3, line 48, change "inlet 1" to --inlet 21--;
("inlet 1" appears twice on same line)

Column 3, line 54, change "inlet 1" to --inlet 21--;

Column 3, line 56, change "inlet 1" to --inlet 21--.

Signed and sealed this 8th day of January 1974.

(SEAL)
Attest:

EDWARD M. FLETCHER, JR.
Attesting Officer

RENE D. TEGTMEYER
Acting Commissioner of Patents